March 23, 1954
C. F. BARRETT, JR
2,672,801
REVERSIBLE DISK PLOW
Filed April 17, 1950
2 Sheets-Sheet 1
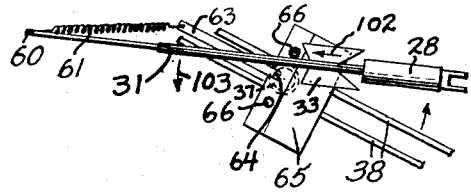
FIG. 1.
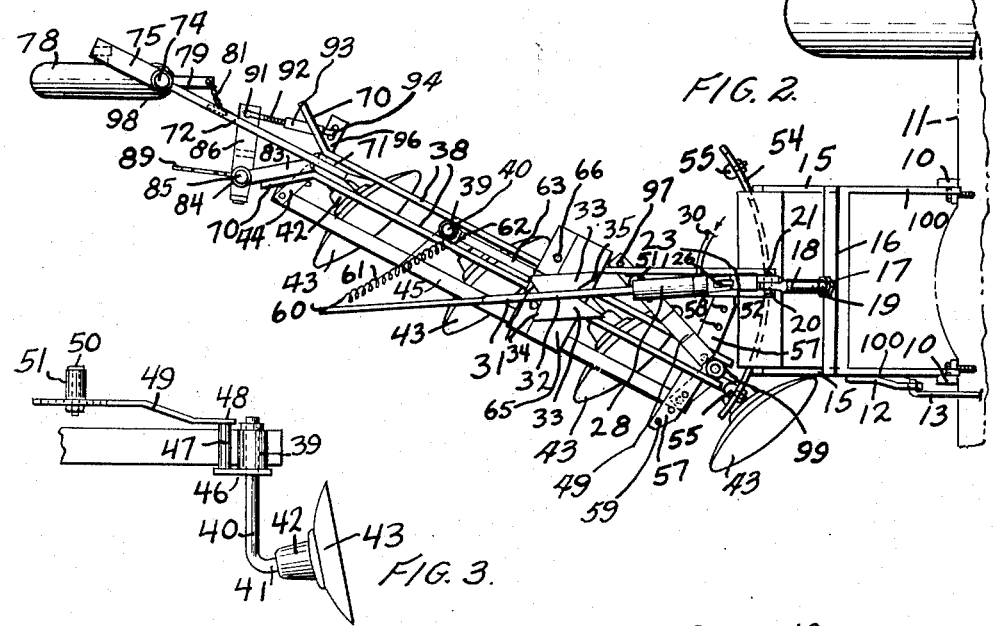
FIG. 2.
FIG. 3.
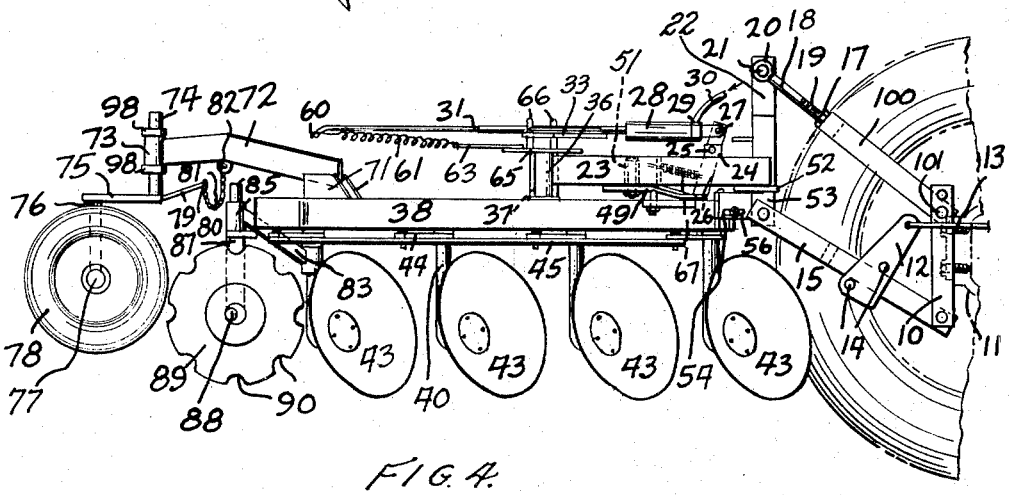
FIG. 4.
INVENTOR.
Charles F. Barrett Jr.
BY
Sam J. Slotsky
ATTORNEY March 23, 1954   C. F. BARRETT, JR   2,672,801
REVERSIBLE DISK PLOW
Filed April 17, 1950   2 Sheets-Sheet 2
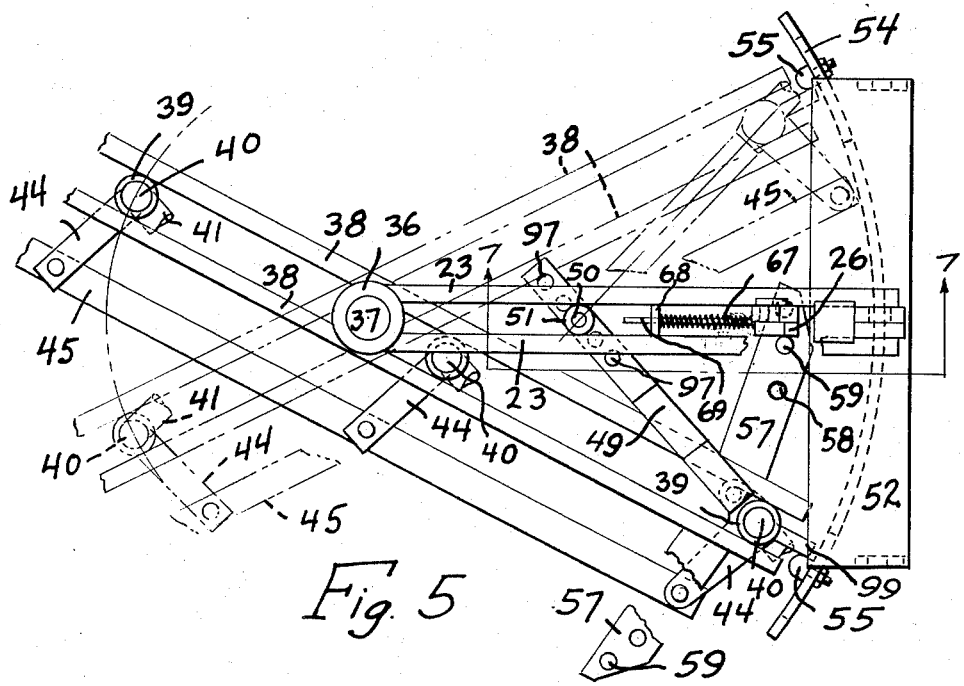
Fig. 5
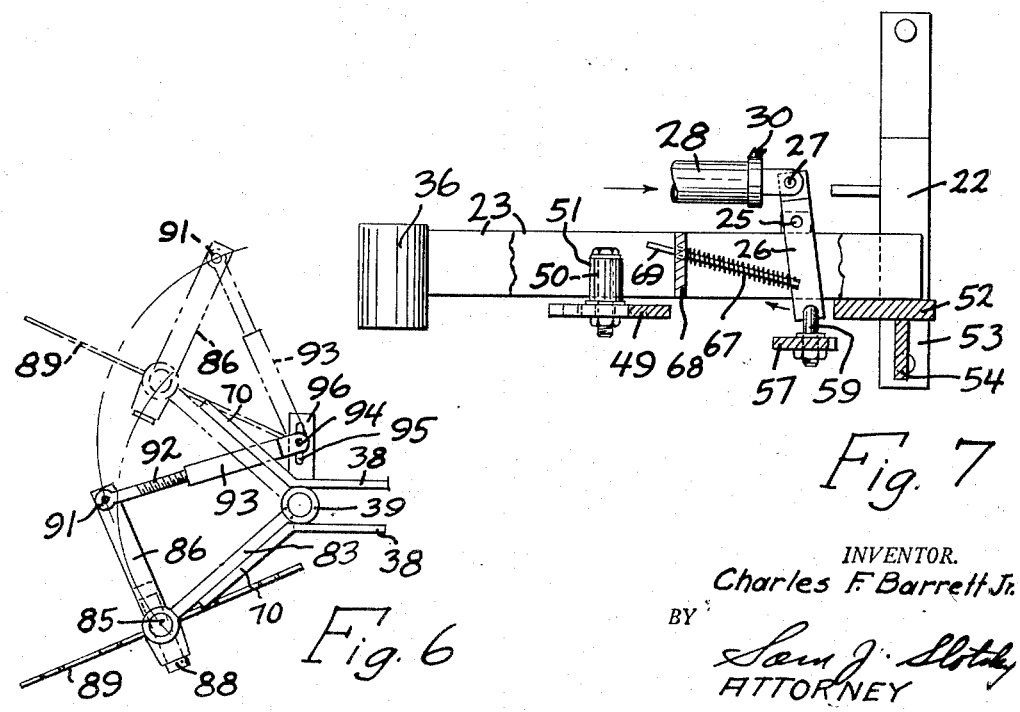
Fig. 6
Fig. 7
INVENTOR.
Charles F. Barrett Jr.
BY
Sam J. Slotky
ATTORNEY

Patented Mar. 23, 1954

2,672,801

UNITED STATES PATENT OFFICE 2,672,801

REVERSIBLE DISK PLOW

Charles F. Barrett, Jr., Plainview, Tex.

Application April 17, 1950, Serial No. 156,479

4 Claims. (Cl. 97—32)

My invention pertains to a disc plow.

An object of my invention is to provide a disc plow which is reversible, and wherein the disc plow can be reversed through the agency of the hydraulic means usually present in a tractor.

A further object of my invention is to provide a reversible disc plow having several discs and which automatically reverses by means of certain hydraulic elements.

A further object of my invention is to provide a reversible disc plow wherein the discs are automatically reversed to the correct pitch as the entire plow arrangement is reversed.

A further object of my invention is to provide a self-adjusting control wheel or coulter.

A further object of my invention is to provide other advantages which will be apparent.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of a detail,

Figure 2 is a plan view of the plow in one of its elevated positions,

Figure 3 is a detail,

Figure 4 is a side elevation of Figure 2,

Figure 5 is a detail,

Figure 6 is a plan view of a detail of the coulter wheel assembly, and

Figure 7 is a sectional view taken substantially along the lines 7—7 of Figure 5.

I have used the character 10 to indicate bracing members attachable to the rear portions 11 of a tractor, the characters 12 and 13 indicating portions operable from the hydraulic arrangement of the tractor, the member 12 including the pins or guides 14 receiving the members 15, and attached across the members 10 is a transverse bar 16 to which is attached at 17 the rod 18 which is threaded at 19, terminating in the eyelet 20 which is pivotally attached at 21 to the vertical bar 22, which bar is rigidly attached to the forwardly extending framework portions 23, which portions 23 are spaced apart as shown principally in Figure 2. Attached to the members 23 are the ears 24 which are pivotally secured at 25 to a latch bar 26 which latch bar is pivotally attached at 27 to a hydraulic cylinder 28.

The hydraulic cylinder 28 communicates at 29 with a suitable tube 30 which passes to the hydraulic arrangement of the tractor, the cylinder including a suitable piston which is attached to a rod 31 to which rod is attached at 32 the keeper members 33 having the sloping faces 34 and 35.

Attached between the members 23 is a journalling member 36 in which is received the vertical pin 37 which pin is attached to the further framework portions 38. Attached between the portions 38 are the further bearing portions 39 in which are fitted the vertical shanks 40 extending into the angularly positioned arms 41 to which arms 41 are freely journalled the hub portions 42 of the plowing discs 43. Attached to the shanks 40 are the further arms 44 which are pivotally secured to a synchronizing bar 45.

The foremost shank 40 is secured to a further arm 46 to which is attached the post 47 to which is attached at 48 a further arm 49 to which arm 49 is attached a pin 50 upon which pin is mounted a roller 51, the roller 51 being positioned between the framework members 23.

The bar 22 is secured to a transverse plate 52 to which are attached the downwardly extending ears 53, and attached to the ears 53 is an arcuate member 54 having the limiting stop members 55 secured thereto, the members 55 being adjustable within the slots 56.

Attached to the framework portions 38 are the transverse bars 57 having the openings 58, which openings can selectively receive the vertical pins 59. Attached to the rod 31 at 60 is a spring 61 which is secured at 62 to a further rod 63 which rod 63 is attached at 64 to one of the plate members 65 to which plate members are attached the substantially lengthened vertical pins 66. The plate 65 is attached to the upper end of pin 37 and is rigid therewith.

Bearing against the latching bar 26 is a compression spring 67 which also bears against the flange 68 secured across the members 23, and pivotally attached to the latching bar 26 is the rod 69 receiving the spring 67 which rod also passes through the member 68 (see Figure 7).

The framework members 38 terminate in the diverging portions 70, and attached to the members 38 also are the upwardly projecting portions 71 between which is welded the bar 72 having the journalling portions 73 receiving the vertical spindle 74 which is attached to an arm 75, which arm is attached to the vertical post 76 having the horizontal portions 77 for journalling the rubber tired wheel 78.

Attached to the arm 75 is the bar 79 which is attached at 80 to the chain 81 which is secured at 82 to the bar 72.

Attached to the end spindle 40 is a bar 83 having the journalling portion 84 in which is journalled a vertical spindle 85 attached to the further horizontal bar 86, and attached to the bar 86 is a vertical bar 87 to which is attached the further horizontal shaft portion 88 upon which is journalled the coulter wheel 89 having the indentations 90 therein.

Pivotally attached at 91 to the horizontal bar 86 is a threaded stud 92 threadably engaging the member 93, which is adjustably and pivotally positioned at 94 within a slot 95 which slot is provided in the bar 96 which is attached to one of the framework portions 38.

The bar 49 (see Figures 2 and 5) includes the spaced openings 97 for providing adjustable attachment of the roller member 51 at desired points. A pair of set collars 98, which can be adjustably locked by means of set screws, serve to support the vertical spindle 74 at a preselected height.

Attached between the framework members 38 is the limiting stop member 99.

Attached to the cross bar 16 are the arms 100 which are pivotally secured at 101 to the members 10.

The device operates in the following manner. Figures 2 and 4 show the plow in its elevated position, just after the framework members 38 have been reversed, or swung to the side as shown in Figure 2, and just after the hydraulic pressure has been applied to raise the arrangement.

The plow is then lowered to the plowing position by releasing the hydraulic pressure which operates the members 12, 13, etc., which allows the various members 15, 100, etc. to swing downwardly, thereby carrying the plow downwardly to the operating or plowing position. As soon as the pressure in the pipe 30 is released, which pressure will be naturally released since it is connected ot the same source of hydraulic pressure, the latch member 26 will swing toward the right, or to the position shown in Figure 7, due to this lack of pressure, and due to the pressure of the spring 67, and whereby the latch member will lie to one side of the pin 59, so that the arrangement will then be locked in this position, and the plow can then function with the discs 43 providing the plowing action.

It will be noted that the engagement of the roller 51, which is attached to the arm 49, with the framework members 23 will swing the entire set of discs 43 to the same angle with respect to the line of travel, due to the fact that all of the discs are attached to various arms 44, and which arms are pivoted to the synchronizing bar 45. In this manner, when the framework 38 is swung to the other side, as will be explained, the arms will also swing by virtue of this engagement, carrying the discs about to the same angle of the line of travel at the other side, or in other words, when the framework 38 occupies the position shown by the dotted lines in Figure 5. Therefore, when the tractor turns around and goes back down the field, and after the plow frame has been reversed, the discs will still occupy the same relative angular position due to this feature. Also, as soon as the pressure is released in the cylinder 28, the rod 31 will travel toward the right as viewed in Figure 2, releasing the face 34 from the lower pin 66 and swinging the rod toward the position shown in Figure 1 until the upper pin 65 rides over the portion 33 and lies against the rod 31 as shown. The plow elements will then occupy this position during the plowing action.

When it is desired to reverse the frame, the hydraulic pressure is applied to the various members 12, 13, etc., which raises the arms 15 and 100, and raises the plow to the non-operating position.

However, as soon as the pressure is applied through the tube 30, the latch 26 will swing to the position shown in Figure 4, whereby the latch will be released from engagement with the pin 59.

At this point the continued forcing of the rod 31 in the direction of the arrow 102 as shown in Figure 1, will tend to pull the bar 63 laterally in the direction of the arrow 103 due to the angular disposition of the rod 31 with respect to the bar 63, the spring 61 serving to provide the connecting link for the pulling action. The motion of the member 33 in the direction of the arrow 102 then continues further until the rod 31 will pass over the center of the pin 37, or upwardly as viewed in Figure 1, at which point the entire framework 38 will be swung in the direction of the arrow 103 and to the other dotted position as shown in Figure 5, thereby placing the plow in the opposite position to that shown in Figure 2, so that after the pressure is again released, which locks the arrangement, the plow will then be positioned in its opposed location. As a result, it will be noted that when it is desired to reverse the plow, all that is necessary is to apply the hydraulic pressure, whereupon the plow will raise and reverse itself automatically at the same time, and after each reversal it can be placed down in the plowing position in its reversed position, whereupon by raising the plow again it will reverse again, this arrangement thereby providing a convenient method of operation.

The stop member 99 abutting against the members 55 will provide means for holding the plow in its plowing position in addition to the latching method described, and it will be noted, as explained heretofore, that the roller 51 can be placed in selected openings 97 for adjusting the amount of pitch of the discs 43, so that by virtue of this construction, the discs can be placed at any angle desired.

The coulter wheel 89, which provides a control wheel as well, will also swing to either side, due to the construction as shown, and maintaining its correct angle with respect to the line of travel. This coulter wheel adjustment can be varied or pitched as desired by virtue of the threaded member 92 engageable with the member 93, so that the coulter wheel can be set to any angle. The framework wheel 78 can be adjusted vertically as desired by means of the collars 98, and as explained, Figure 4 showing the wheel in its approximate raised position, with the lower edges of the discs being lower naturally due to the fact that they will enter the ground.

It will now be noted that I have provided a reversible plow which includes a variety of features, the advantages of which have been explained in the objects of my invention, this plow also including other advantages which are readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their their scope.

I claim as my invention:

1. A reversible disc plow comprising a framework including a plurality of plowing discs attached thereto said discs including shanks attached thereto, a further framework for attachment to a tractor, said framework being pivotally attached to said further framework, hydraulic means for reversing said framework whereby said discs can be swung to one side of the direction of travel or the other, said hydraulic means comprising a hydraulic cylinder, means communicating between said cylinder and the tractor hydraulic system, a ram piston in said cylinder, a rod attached to said piston, spring means attached between the end of said rod and said framework for swinging said framework, said discs being mounted for pivotal movement in said framework and including lever arms attached thereto, a synchronizing bar pivotally attached to said lever arms for moving said discs to pre-determined angles, a bar attached to one of said disc shanks including a roller engageable with said further framework whereby swinging of said framework will cause said discs to be pitched at the same angle to the line of travel when swung to either side.

2. A reversible disc plow comprising a framework including a plurality of plowing discs attached thereto said discs including shanks attached thereto, a further framework for attachment to a tractor, said framework being pivotally attached to said further framework, hydraulic means for reversing said framework whereby said discs can be swung to one side of the direction of travel or the other, said hydraulic means comprising a hydraulic cylinder, means communicating between said cylinder and the tractor hydraulic system, a ram piston in said cylinder, a rod attached to said piston, spring means attached between the end of said rod and said framework for swinging said framework, said discs being mounted for pivotal movement in said framework and including lever arms attached thereto, a synchronizing bar pivotally attached to said lever arms for moving said discs to pre-determined angles, a bar attached to one of said disc shanks including a roller engageable with said further framework whereby swinging of said framework will cause said discs to be pitched at the same angle to the line of travel when swung to either side, a keeper member attached to said rod, a plate member attached to said framework including a pair of vertical pins attached thereto, said keeper having sloping faces, either of which is engageable with either of said pins, a bar attached to said plate member, said spring means being attached between said bar and said rod whereby said bar will swing said plate and said framework when pressure is applied to the piston attached to said rod, and whereby said pins will provide stop means against said keeper member and said rod.

3. A reversible disc plow comprising a framework including a plurality of plowing discs attached thereto said discs including shanks attached thereto, a further framework for attachment to a tractor, said framework being pivotally attached to said further framework, hydraulic means for reversing said framework whereby said discs can be swung to one side of the direction of travel or the other, said hydraulic means comprising a hydraulic cylinder, means communicating between said cylinder and the tractor hydraulic system, a ram piston in said cylinder, a rod attached to said piston, spring means attached between the end of said rod and said framework for swinging said framework, said discs being mounted for pivotal movement in said framework and including lever arms attached thereto, a synchronizing bar pivotally attached to said lever arms for moving said discs to pre-determined angles, a bar attached to one of said disc shanks including a roller engageable with said further framework whereby swinging of said framework will cause said discs to be pitched at the same angle to the line of travel when swung to either side, a keeper member attached to said rod, a plate member attached to said framework including a pair of vertical pins attached thereto, said keeper having sloping faces, either of which is engageable with either of said pins, a bar attached to said plate member, said spring means being attached between said bar and said rod whereby said bar will swing said plate and said framework when pressure is applied to the piston attached to said rod, and whereby said pins will provide stop means against said keeper member and said rod, a latch bar pivotally attached to said cylinder, a frame member attached to said framework including further pins therein engageable against said latch bar for retaining the framework in plowing position, and whereby release of pressure on said cylinder will swing said latch bar out of engagement with said further pins.

4. A reversible disc plow comprising a framework including a plurality of plowing discs attached thereto said discs including shanks attached thereto, a further framework for attachment to a tractor, said framework being pivotally attached to said further framework, hydraulic means for reversing said framework whereby said discs can be swung to one side of the direction of travel or the other, said hydraulic means comprising a hydraulic cylinder, means communicating between said cylinder and the tractor hydraulic system, a ram piston in said cylinder, a rod attached to said piston, spring means attached between the end of said rod and said framework for swinging said framework, said discs being mounted for pivotal movement in said framework and including lever arms attached thereto, a synchronizing bar pivotally attached to said lever arms for moving said discs to pre-determined angles, a bar attached to one of said disc shanks including a roller engageable with said further framework whereby swinging of said framework will cause said discs to be pitched at the same angle to the line of travel when swung to either side, a keeper member attached to said rod, a plate member attached to said framework including a pair of vertical pins attached thereto, said keeper having sloping faces, either of which is engageable with either of said pins, a bar attached to said plate member, said spring means being attached between said bar and said rod whereby said bar will swing said plate and said framework when pressure is applied to the piston attached to said rod, and whereby said pins will provide stop means against said keeper member and said rod, a latch bar pivotally attached to said cylinder, a frame member attached to said framework including further pins therein engageable against said latch bar for retaining the framework in plowing position, and whereby release of pressure on said cylinder will swing said latch bar out of engagement with said further pins, brackets attached to said tractor, pivotal arms secured to said brackets, means for operating said pivotal arms from the tractor hydraulic system, a further bracket for suspending the plow framework pivotally secured to said arms, and whereby hydraulic pressure to said cylinder operating simultaneously with the raising action of said arms will operate said piston and said latch and keeper members.

CHARLES F. BARRETT, JR.

References Cited in the file of this patent

UNITED STATES PATENTS

| Number | Name | Date |
|---|---|---|
| 2,041,216 | Sjogren | May 19, 1936 |
| 2,084,629 | Coviello | June 22, 1937 |
| 2,163,832 | Coviello | June 27, 1939 |
| 2,202,348 | Leach | May 28, 1940 |

FOREIGN PATENTS

| Number | Country | Date |
|---|---|---|
| 103,299 | Australia | Mar. 3, 1938 |